(12) United States Patent
Schaefer et al.

(10) Patent No.: US 9,680,409 B2
(45) Date of Patent: Jun. 13, 2017

(54) ADJUSTABLE COMBINED FLASHING AND MOUNTING APPARATUS AND METHOD OF MOUNTING TO BE USED THEREWITH

(71) Applicant: D Three Enterprises, LLC, Lafayette, CO (US)

(72) Inventors: Richard F. Schaefer, Fort Lupton, CO (US); David Kreutzman, Louisville, CO (US)

(73) Assignee: D Three Enterprises, LLC, Lafayette, CO (US)

( * ) Notice: Subject to any disclaimer, the term of this patent is extended or adjusted under 35 U.S.C. 154(b) by 0 days.

(21) Appl. No.: 14/608,569

(22) Filed: Jan. 29, 2015

(65) Prior Publication Data
US 2015/0270802 A1 Sep. 24, 2015

Related U.S. Application Data

(60) Provisional application No. 61/933,004, filed on Jan. 29, 2014.

(51) Int. Cl.
*A47G 29/02* (2006.01)
*H02S 20/23* (2014.01)
*F24J 2/52* (2006.01)

(52) U.S. Cl.
CPC .............. *H02S 20/23* (2014.12); *F24J 2/5245* (2013.01); *Y02B 10/12* (2013.01); *Y02B 10/20* (2013.01); *Y02E 10/47* (2013.01)

(58) Field of Classification Search
CPC ......... H02S 20/22; H02S 20/24; F24J 2/5245; F24J 2/5249; F24J 2002/5296;
(Continued)

(56) References Cited

U.S. PATENT DOCUMENTS 2,095,832 A 10/1937 Retzke
3,104,120 A 9/1963 Myers
(Continued)

FOREIGN PATENT DOCUMENTS

JP 11-324259 11/1999
JP 2006144268 6/2006
WO 2007079584 7/2007

OTHER PUBLICATIONS

SnapNrack Roof Mount, Installation Manual, Sep. 19, 2009, 44 pages.

*Primary Examiner* — Christopher E Garft
(74) *Attorney, Agent, or Firm* — Russell T. Manning; Marsh Fischmann & Breyfogle LLP

(57) ABSTRACT

The present disclosure is directed to a roof mounting system that utilizes a base plate that is affixed to a roof surface by multiple fasteners (e.g., lag bolts, screws etc.) and a cap (e.g., top cap) that attaches to the base plate covering the fasteners affixing the base plate to the roof surface. Once attached, the top cap covers the fasteners preventing water infiltration. To further waterproof the fasteners affixing the base plate to the roof surface, the base plate includes a raised or elevated section on its top surface with a planar flange extending around the elevated section. A portion of the flange may be disposed beneath a single or shingles on a roof surface. The fasteners extend through the elevated section. Accordingly, water drains around the elevated section when the base plate is attached to a roof surface further isolating the fasteners.

20 Claims, 25 Drawing Sheets

(58) Field of Classification Search
CPC .. F24J 2/5294; F24J 2002/5294; Y02B 10/12; Y02B 10/20; Y02E 10/47
USPC .... 248/237, 342, 519, 346.01; 52/741.4, 60, 52/59, 302.6, 58; 211/119.009, 87.01, 211/105.1
See application file for complete search history.

(56) References Cited

U.S. PATENT DOCUMENTS

| | | | |
|---|---|---|---|
| 3,408,780 A | 11/1968 | Brister | |
| 4,640,535 A | 2/1987 | Hermann | |
| 4,739,596 A | 4/1988 | Cunningham et al. | |
| 5,482,329 A | 1/1996 | McCall et al. | |
| 5,594,202 A | 1/1997 | Tobias | |
| 5,729,938 A | 3/1998 | Tobias | |
| 5,746,839 A | 5/1998 | Dinwoodie | |
| 5,799,804 A * | 9/1998 | Sharpe | A47K 10/04 211/105.1 |
| 6,141,928 A | 11/2000 | Platt | |
| 6,360,491 B1 | 3/2002 | Ullman | |
| 6,516,741 B1 | 2/2003 | Sorum et al. | |
| 6,526,701 B2 | 3/2003 | Stearns et al. | |
| 6,672,018 B2 | 1/2004 | Shingleton | |
| 6,698,799 B2 | 3/2004 | Anderson et al. | |
| 6,738,167 B1 | 5/2004 | Suzuki | |
| 6,969,799 B2 | 11/2005 | Snyder | |
| 7,128,345 B2 | 10/2006 | Bartholoma et al. | |
| 7,435,134 B2 | 10/2008 | Lenox | |
| 7,762,027 B1 | 7/2010 | Wentworth et al. | |
| 7,762,030 B2 | 7/2010 | Espinosa | |
| 7,780,472 B2 | 8/2010 | Lenox | |
| 7,861,485 B1 | 1/2011 | Wentworth et al. | |
| 7,895,808 B1 | 3/2011 | Wentworth et al. | |
| 7,905,064 B1 | 3/2011 | Wentworth et al. | |
| 8,025,508 B2 | 9/2011 | Parker et al. | |
| 8,158,884 B2 | 4/2012 | de la Borbolla | |
| 8,166,713 B2 | 5/2012 | Stearns et al. | |
| 8,176,693 B2 | 5/2012 | Abbott et al. | |
| 8,181,398 B2 | 5/2012 | Stearns et al. | |
| 8,225,557 B2 | 7/2012 | Stearns et al. | |
| 8,245,454 B2 | 8/2012 | Stearns et al. | |
| 8,272,174 B2 | 9/2012 | Stearns et al. | |
| 8,276,330 B2 | 10/2012 | Harberts et al. | |
| 2003/0015636 A1 | 1/2003 | Liebendorfer | |
| 2003/0015637 A1 | 1/2003 | Liebendorfer | |
| 2003/0070368 A1 | 4/2003 | Shingleton | |
| 2003/0101662 A1 | 6/2003 | Ullman | |
| 2007/0137126 A1 | 6/2007 | Sommerhein | |
| 2008/0000173 A1 | 1/2008 | Lenox et al. | |
| 2008/0244881 A1 | 10/2008 | Zante | |
| 2008/0302928 A1 | 12/2008 | Haddock | |
| 2010/0175337 A1 | 7/2010 | Mascolo et al. | |
| 2010/0192505 A1 | 8/2010 | Schaefer et al. | |
| 2010/0307074 A1 | 12/2010 | Stearns et al. | |
| 2011/0036028 A1 | 2/2011 | Beck | |
| 2011/0120047 A1 | 5/2011 | Stearns et al. | |
| 2011/0179727 A1 | 7/2011 | Liu | |
| 2011/0214365 A1 | 9/2011 | Aftanas | |
| 2011/0247279 A1 | 10/2011 | Stearns et al. | |
| 2011/0247295 A1 | 10/2011 | Stearns et al. | |
| 2012/0023843 A1 | 2/2012 | Stearns et al. | |
| 2012/0031019 A1 | 2/2012 | Stearns et al. | |
| 2012/0031024 A1 | 2/2012 | Selke et al. | |
| 2012/0090263 A1* | 4/2012 | Schaefer | H02G 3/088 52/741.4 |
| 2012/0097816 A1 | 4/2012 | Tamm et al. | |
| 2012/0102853 A1 | 5/2012 | Rizzo | |
| 2012/0181402 A1 | 7/2012 | Putz et al. | |
| 2012/0205508 A1 | 8/2012 | Cusson et al. | |
| 2012/0244729 A1 | 9/2012 | Rivera et al. | |
| 2013/0102165 A1 | 4/2013 | DuPont | |
| 2014/0102517 A1 | 4/2014 | Meine et al. | |

* cited by examiner

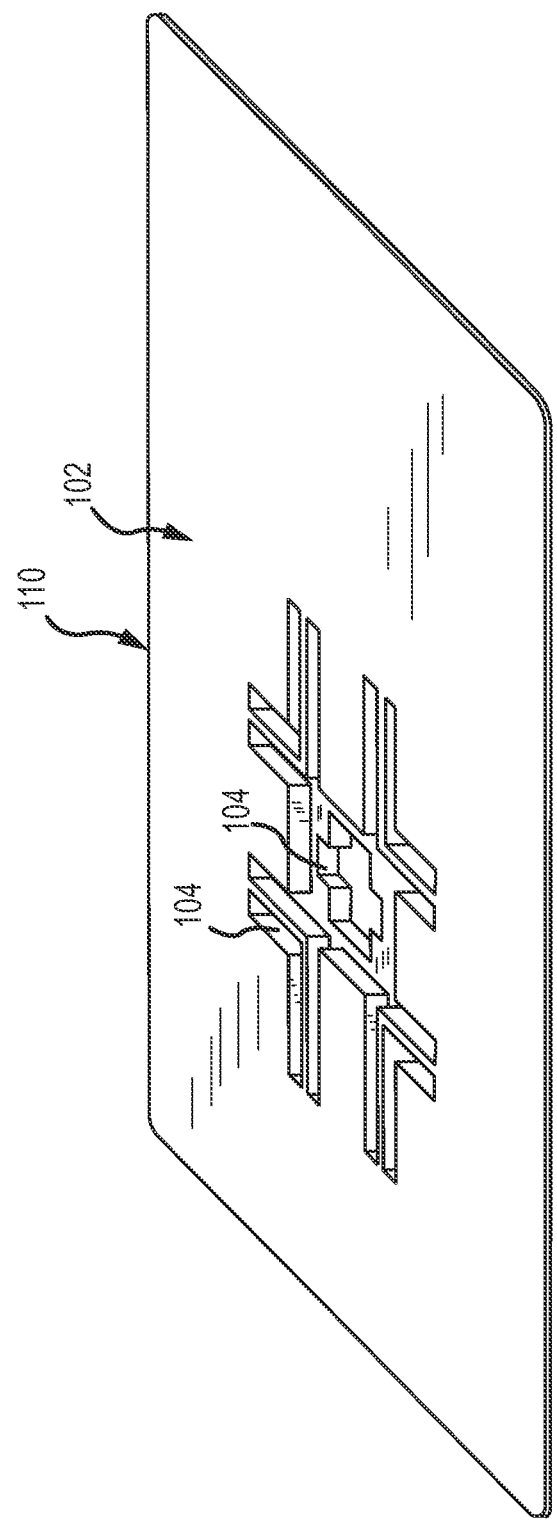

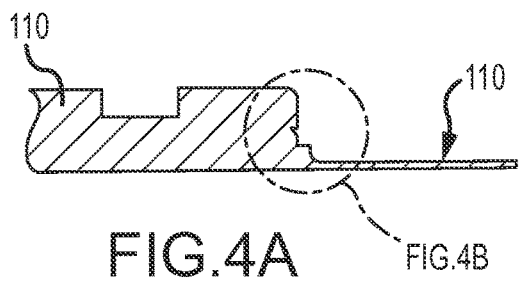
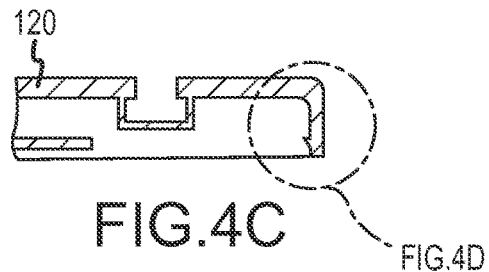
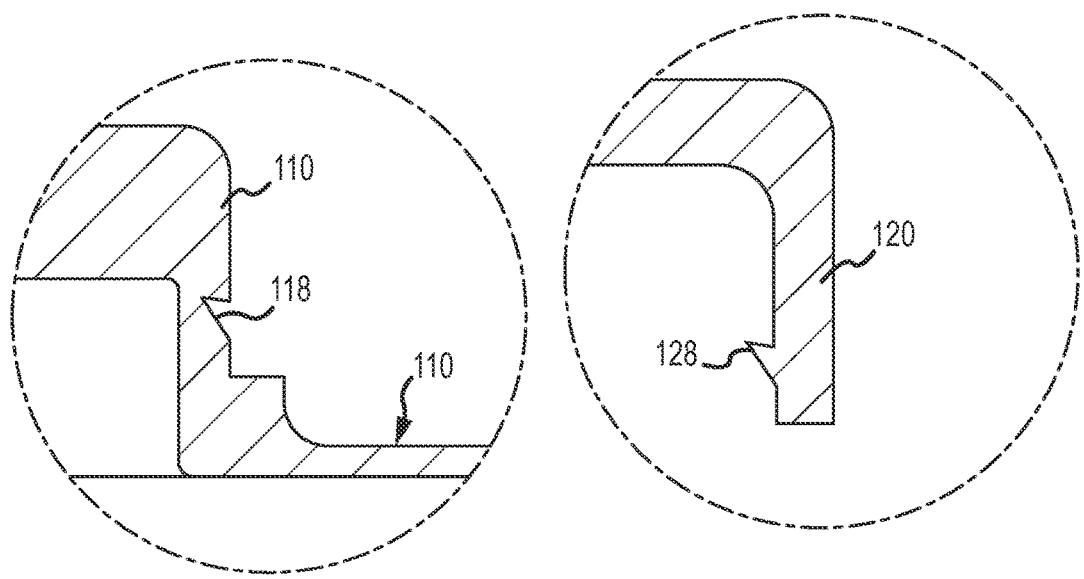

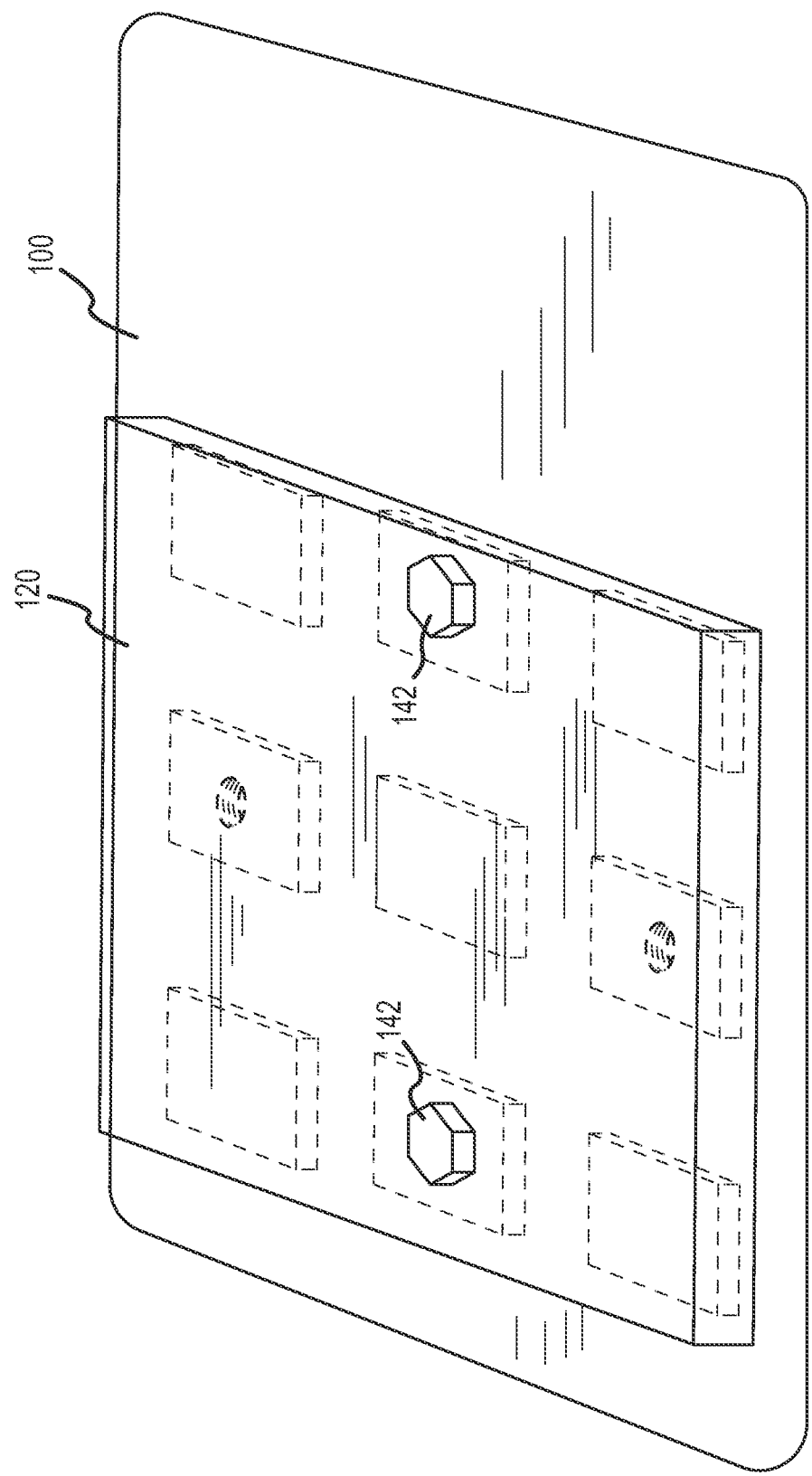

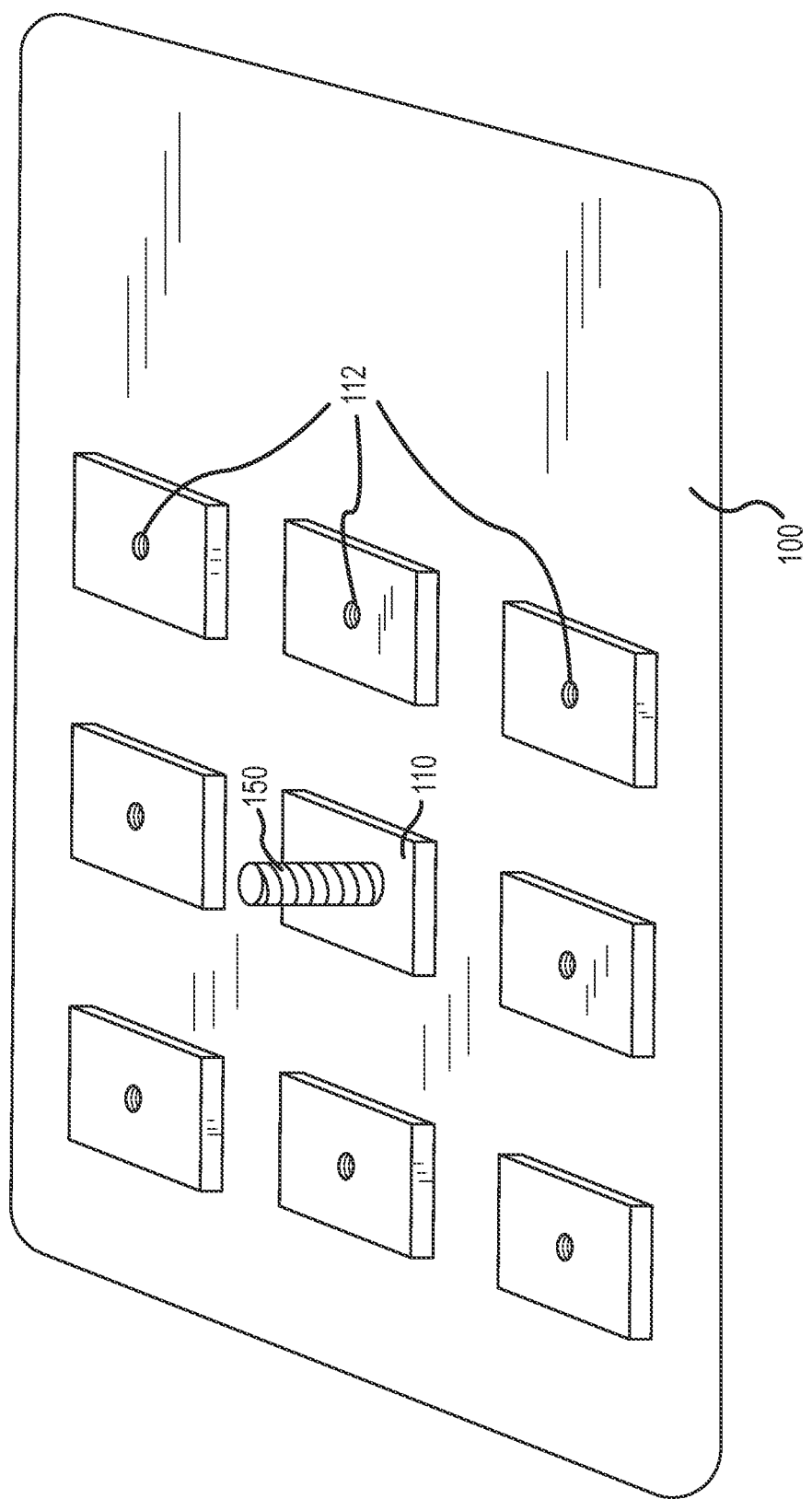

ADJUSTABLE COMBINED FLASHING AND MOUNTING APPARATUS AND METHOD OF MOUNTING TO BE USED THEREWITH

CROSS REFERENCE

The present application claims the benefit of the filing date of U.S. Provisional Application No. 61/933,004 having a filing date of Jan. 29, 2014, the entire contents of which is incorporated herein by reference.

BACKGROUND

Many systems exist to mount various devices on roof tops and similar locations. One common device to mount on roofs is solar panels, particularly photovoltaic (PV) solar panels. Currently, to mount PV solar panels or other similar devices, rack systems are generally used. Due to the weight and attachment mechanism used with these rack systems, the attachment to the roof is typically into structural members. This requires that the roof framing be located beneath the shingles. The location of the rafters dictates the location and therefore spacing of the racking system, or at least its anchor points. Further, the installation can be made more difficult by unevenly spaced rafters and/or ones that are not strait and/or parallel or structures with no rafters, or purlins, such as stress skin panel installations. Additionally, the rails add significantly to the total height and weight of the system and to the cost of the installation.

The foregoing example of the related art and limitations related therewith are intended to be illustrative and not exclusive. Other limitations of the related art will become apparent to those of skill in the art upon a reading of the specification and a study of the drawings.

SUMMARY

One aspect of the present disclosure is a roof mounting system for PV panels and other devices that does not require rails, but allows the use of rails if desired.

One aspect of the present disclosure is a roof mounting system that can be mounted on to locations other than a rafter.

Another aspect of the present disclosure is a mounting system that allow attachment of a PV panel along different locations in at least two directions.

Another aspect of the present disclosure is a roof mounting system that reduces or prevents water leakage.

In one aspect, the present disclosure is directed to a roof mounting system that utilizes a base plate that is affixed to a roof surface by multiple fasteners (e.g., lag bolts, screws etc.) and a cap (e.g., top cap) that attaches to the base plate covering the fasteners affixing the base plate to the roof surface. Once attached, the top cap covers the fasteners preventing water infiltration. To further waterproof the fasteners affixing the base plate to the roof surface, the base plate includes a raised or elevated section on its top surface. Typically, a planar flange extends around the elevated section. A portion of the flange may be disposed beneath a single or shingles on a roof surface. Most commonly, the fasteners extend through the elevated section such that the heads of the fasteners are disposed above the surface of the flange. In this regard, water drains around the elevated section when the base plate is attached to a roof surface further isolating the fasteners extending through the base plate. In one arrangement, the elevated section includes a plurality of fastener recesses that extend at least partially through the base plate. Once fasteners affix the base plate to the roof surface, the top cap is attached to the base plate using a fastener.

In one arrangement, a bottom surface of the top cap is recessed and sized to receive the elevated section of the base plate. In such an arrangement, a periphery of the recessed bottom surface of the top cap may fit around the periphery of the elevated section. In any arrangement, once the top cap is fastened/affixed to the base plate, objects may be attached to an attachment structure of the top cap and/or base plate.

The base plate may have any geometric configuration. Typically, the base plate is generally rectangular having a planar bottom surface. However, other shapes are possible and considered within the scope of the present disclosure. In one arrangement, the elevated section is disposed within a periphery of the top surface of the base plate such that the portion of the base plate that extends beyond the elevated section forms a flange. In various arrangements, one end of the flange may be longer than other portions of the flange to allow for its placement beneath a roof shingle(s).

In one arrangement, the fastener comprises a snap fit arrangement between the elevated section of the base plate and the top cap. In such an arrangement, an inside periphery of the recessed bottom surface of the top cap may include detents or spring tabs and the outside periphery of the elevated section may include mating spring tabs or detents. In another arrangement, the base plate may include one or more threaded fasteners. Such threaded fasteners may be female fasteners (e.g., nuts) or mail threaded fasteners (e.g., studs) that are affixed within the base plate. In such an arrangement the top cap may include apertures that align with the threaded fasteners in the base plate. Accordingly, mating fasteners may extend through the top cap and into the base plate to affix the top cap to the base plate. In addition, such fasteners may be utilized to affix objects (e.g., brackets, flanges etc.) to the top cap. In another arrangement, the elevated section and top cap may be substantially circular. In this arrangement an outside periphery of the elevated section may have threads and inside periphery of the recessed surface of the top cap may have mating threads. In this arrangement, the top cap may be threaded onto the elevated section. Such an arrangement may provide height adjustment for the top cap.

In one arrangement, one or more fastener recesses are formed within the interior periphery of the elevated section. Such fastener recesses may extend at least partially through the base plate. Such fastener recesses are, in one embodiment, non-aligned. That is, such fastener recesses may not be aligned perpendicular to an edge of the base plate. This may prevent insertion of multiple fasteners into a seam between sheathing on a roof surface.

In any arrangement, the roof mounting system includes a structure for attaching a component or object to the top cap. In one arrangement, the top cap includes a projection integrally formed on its surface. For instance, the top cap may include an integrally formed flange having one or more apertures for attaching an object thereto. In another arrangement, the top cap may include one or more apertures for threading an object (e.g., bolt) directly into the top cap. Alternatively, the top cap may have one or more apertures that permit threading object into or onto a threaded element in the base plate. Most typically, an object attached to the top cap or base plate via a threaded fastener will not thread directly into the roof surface. However, this is not a requirement.

In one arrangement, the elevated section of the base plate includes one or more recessed channels. These channels may extend in a common direction or intersect. In this arrangement, the top cap may also include one or more mating recessed channels. These channels may have an overhanging lip that allows for maintaining an object within the channel. For instance, in cross-section such channels in the top cap may have an inverted T-shape or an L-shape. That is, a closed bottom end of the channel may be wider than an open upper end of the channel.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

FIGS. 2A and 2B illustrate top and bottom views of one embodiment of a base plate of a roof mounting system.

FIGS. 3A and 3B 2B illustrate top and bottom views of one embodiment of a top cap of a roof mounting system.

FIG. 4 illustrates one embodiment of a fastener between a base plate and top cap of a roof mount system.

FIGS. 6A-6D illustrate another embodiment of a roof mount system.

FIGS. 7A-7C illustrate another embodiment of a roof mount system.

DETAILED DESCRIPTION

Figure 1:
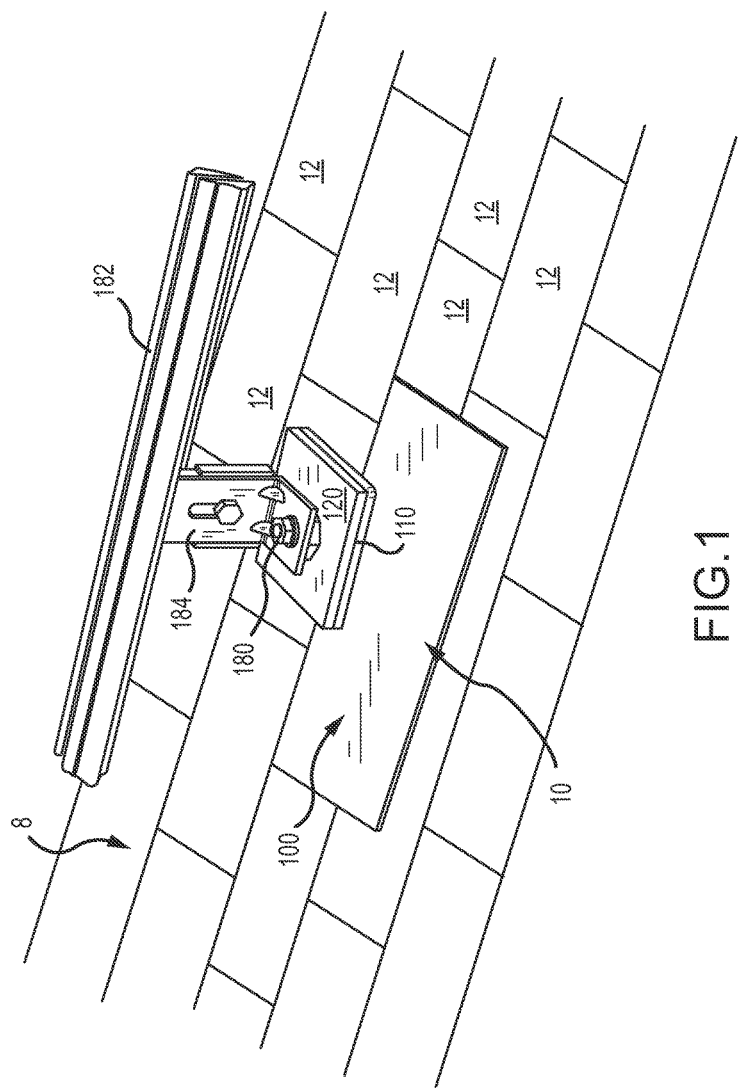
FIG. 1 illustrates a roof mounting system.

All references to horizontal and vertical contained herein are references to the orientation of the items in the drawings. No limitation should be inferred as to the actual orientation of the items in use.

In a number of applications, it is desirable to mount one or more structures to a roof surface. For instance, photovoltaic solar cells are often mounted to the roof of a residence or other structure. Typically, mounting feet or bases (e.g., mounting systems) are attached to the surface of the roof to provide an anchor point for the structures to be attached to the roofing surface. Previously, such systems required attachment to underlying structures in the roofing surface. For instance, in residential construction, wooden sheathing is often applied over structural rafters. In order to provide necessary pullout strength for a photovoltaic cell, previous systems have required that the mounting bases of the mounting systems to be affixed to the rafters. Typically, such mounting bases are attached utilizing bolts such as lag screws which extend through the base and into the underlying rafters. In the case of photovoltaic cells, pullout strength and compression loading strength is a function of the size of the individual solar cells.

That is, wind loading and compression loading (e.g., snow loading) requirements have dictated that mounting bases be attached to underlying rafters. Such requirements are commonly dictated by local or regional building codes.

The presented roof mounting systems are designed in a manner that allows for attaching a mounting base to sheathing of the structure without necessarily requiring attachment to the underlying structural supports/rafters. That is, the presented roof mounting systems provide pullout and compression loading that exceeds code requirements without requiring attachment to underlying rafters. This allows the roof mounting systems to be applied to a roof surface without regard to the location of underlying structural members. Stated otherwise, the roof mounting systems may be located anywhere on a roof surface including between rafters. In this regard, the presented roof mounting systems allow for more readily laying out a set of roof mounts and more quickly attaching these to a roof surface.

FIG. 1 illustrates one exemplary embodiment of a roof mounting system 10 that may be affixed to a roof surface to provide a mount for attaching structures (e.g., PV panels) to the roof surface. Generally, the roof mounting system includes a base plate 100 that rests on the roof surface 8. Fasteners, such as screws, lag bolts etc. (not shown) extend through a raised section 110 of the base plate 100 to affix the base plate to the roof surface. The raised section is disposed within the periphery of a generally flat or planar flange 108, which may, in some applications, be partially disposed beneath shingles 12 on the roof surface 8. In the illustrated embodiment, the raised section 110 is at least partially covered by a top cap 120. The top cap 120 covers the fasteners that pass through the raised section and extend into the roof surface 8. In this regard, the top cap 120 prevents water from passing though the base plate 110 at the locations where the fasteners that pass the base plate 110 and into the roof surface 8. Once the base plate 110 and top cap 120 are connected, one or more fasteners 180 may be connected to the top cap 120 and/or the base plate to attach objects, such as a support rail 182 to the roof surface 8. Further, various brackets 184 may be utilized to connect the object 182 to the top cap 120 and/or base plate 110.

Figure 2A:
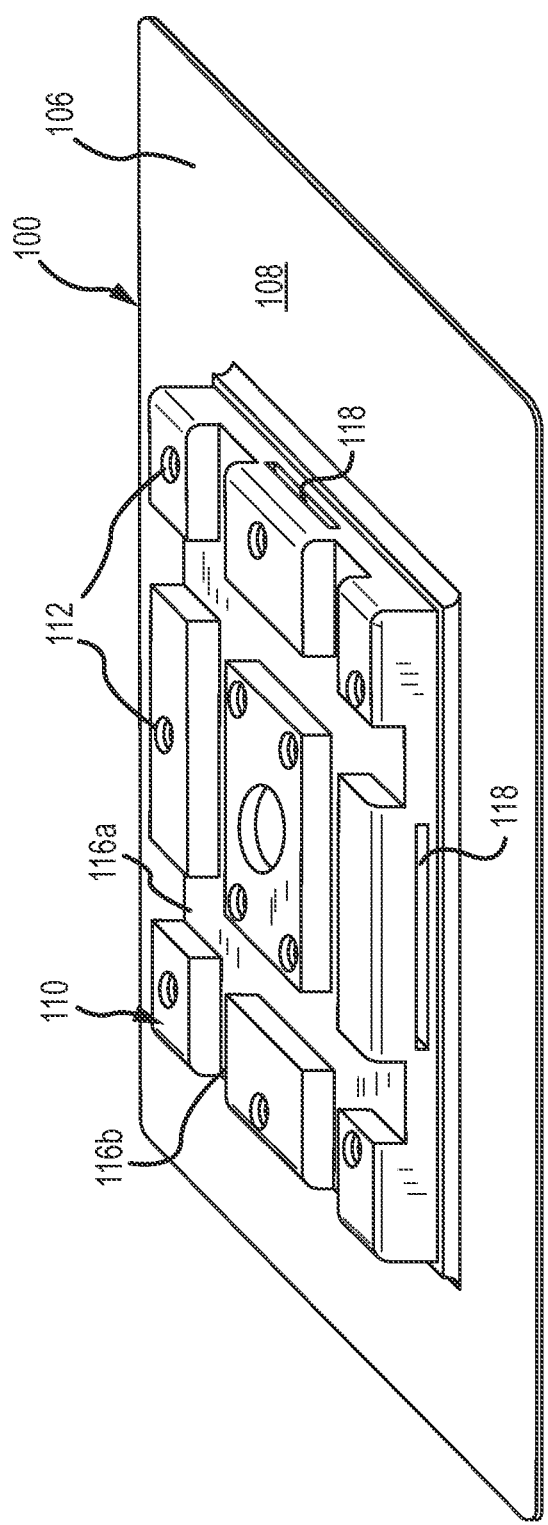

FIGS. 2A and 2B illustrate top and bottom views of one embodiment of a base plate 100 of the roof mounting system 10. As shown, the base plate 100 has a substantially planar bottom surface 102 that is adapted for placement on a roof surface. The bottom surface 102, though generally planar, my include various recesses 104 for weight reduction purposes and/or to secure, for example, T-bolts and T-nuts while preventing their rotation, as further discussed herein. The top surface 106 includes one or more raised sections 110 that extend above a generally planar peripheral portion or flange 108. As shown, the flange 108 extends beyond the base of the raised section 110 in all directions. One end of the flange 108 is typically longer than the opposing end such that the long end may be disposed beneath a course of shingles 12. When applied to the roofing surface, the outside edges of the bottom surface of the base plate 100 may include a bead of caulk or other sealing material. Placement of the long end of the flange 108 below shingles allows the base plate to shed water. Further, the base plate is an integral structure. That is, the raised section 110 and the flange 108 are a single piece. This prevents any water from seeping between the raised sections and the flange further isolating the fasteners. In one embodiment, the base plate 100 is an injection molded. In such an embodiment, the base plate may be polymeric. However, it will be appreciated that the base plate may be made using other processes and materials.

As noted, the raised section 110 is disposed within the interior of the periphery of the flange 108 on the base plate's top surface. The raised section 110 includes a plurality of fastener ports or recesses 112. These fastener recesses 112 are spaced throughout the raised section(s) 110 and preferably only extend a portion of the way through the raised section 110 towards the bottom surface 104 of the base plate 100. In use, an installer may insert a screw or other fastener into the fastener recesses 112 and driving these fasteners through the bottom surface 104 of the base plate 100 and into a roof surface. As the bottom ends of the fastener recesses 112 are preferably closed, there is no penetration through the base plate 100 if one of the fastener recesses does not receive a fastener. Further, as the fastener recesses 112 are disposed in the raised section(s) 110, water on the surface of the base plate is isolated from the fasteners. That is, the base plate is typically disposed on an angled roof surface and water sheds around the raised section(s). Thus water running down the roof surface is prevented from entering into the fastener recesses 112.

The size of the base plate is such that it is able to distribute weight over the roofing surface to an extent that allows adequate compression strength when applied to sheathing free of underlying structural supports (e.g., between rafters). In one arrangement, the raised section of the base plate is approximately 6"×6". However, this is not a requirement. In such an arrangement, the flange may extend 2-4 inches beyond the edge of the raised section on three sides and about 4-8 inches beyond the raised section on the edge that fits beneath the shingles. Again, variations may be made. However, it has been determined that the base plate of this size will provide enough surface area to provide sufficient compression strength when mounted between rafters while complying with most building codes.

In the illustrated embodiment, the raised section includes twelve fastener recesses 112. Use of such a large number of fastener recesses allows the roof mounting system to have a pull out strength that meets or exceeds most building codes. In one arrangement, the fastener recesses 112 are non-aligned. That is, each fastener recess is slightly offset from an adjacent fastener recess; each row or column of fastener recesses is non-perpendicular to an edge of the base plate 100. In this regard, if one of the fastener recesses is disposed directly above a seam between two sheathing members, only a single fastener is inserted into the seam. Adjacent fasteners in adjacent fastener recesses are offset from the seam. In this regard, the remaining 11 fasteners may attach to the sheathing. Accordingly, has been determined that nine or more fasteners typically provides adequate pullout strength even when not extending into underlying structural members. Stated otherwise, the number and spacing of the apertures provides adequate pullout strength to meet code requirements even when the base plate 100 is solely attached to sheathing.

As shown in FIG. 2A, the raised section 110 includes at least first and second transverse channels 116A, 116B (hereafter 116 unless specifically referenced) that separate the raised section 110 into multiple independent sections. These channels, if utilized, provide a location for attaching an object to the mounting system and allow for X and Y adjustment of such an object. However, it will be appreciated that not all embodiments of the system 10 require such channels.

Figure 3A:
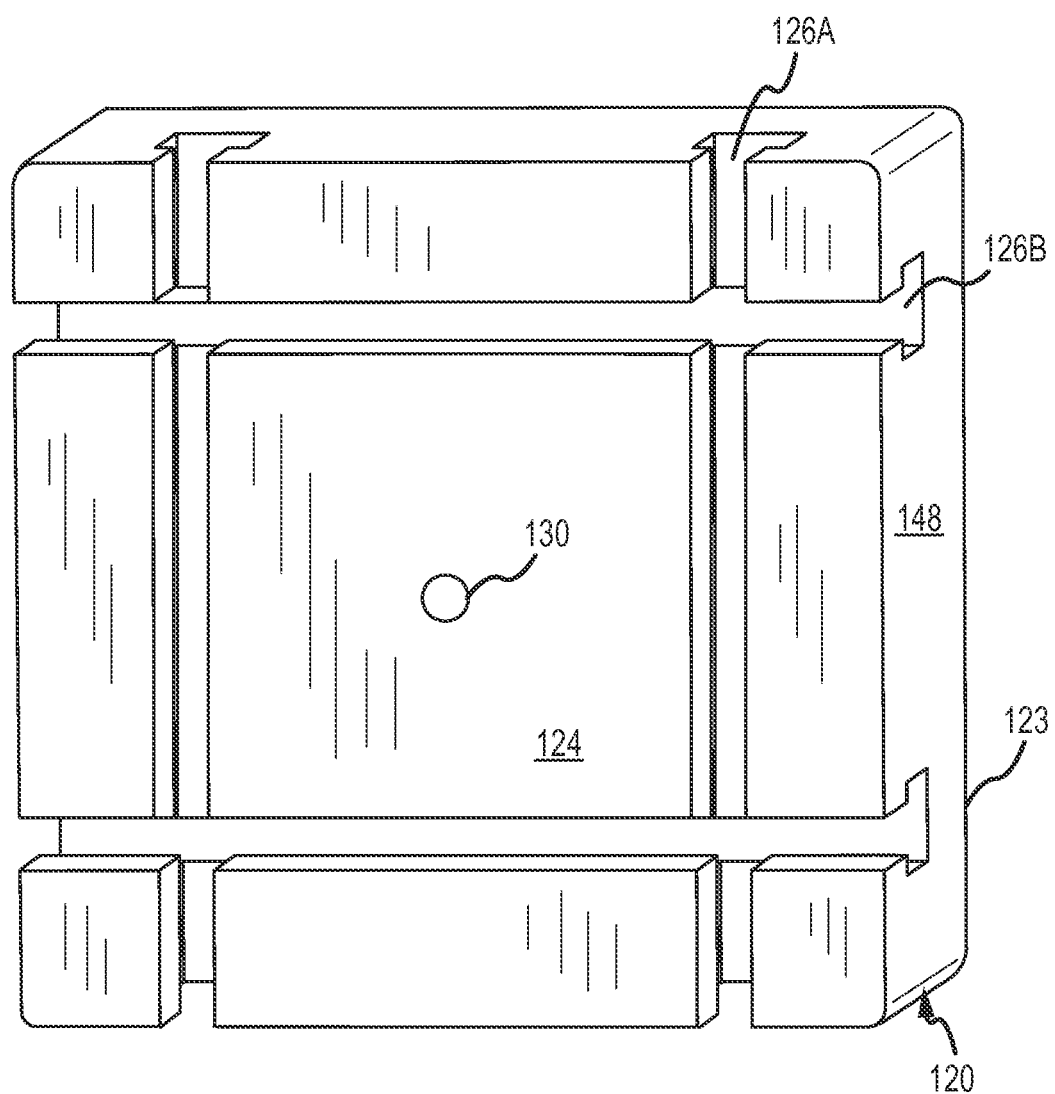
Figure 3B:
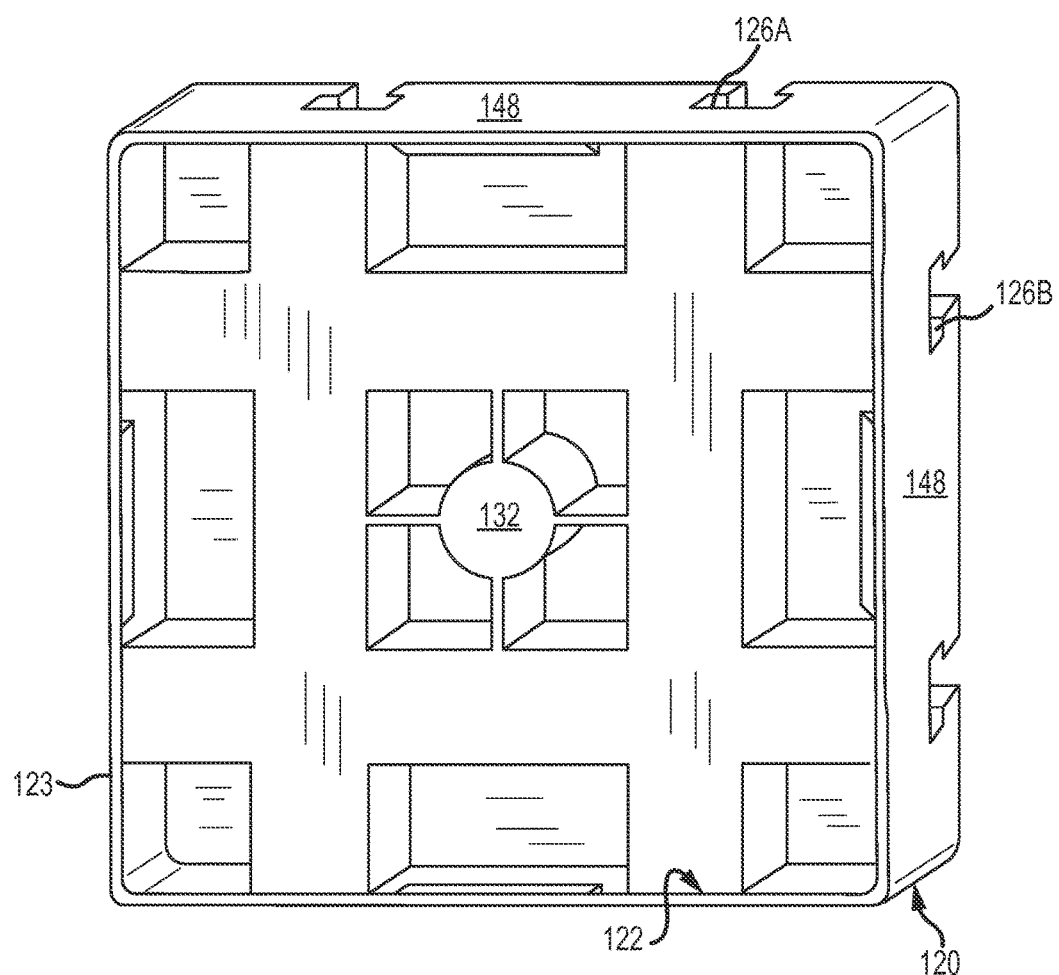

FIGS. 3A and 3B illustrate a top and bottom view of one embodiment of a top cap 120.

As shown, a bottom surface 122 of the top cap 120 is recessed to receive the raised section 110 of the base plate 100. In the illustrated embodiment, the bottom surface 122 has a plurality of individual recesses that are formed between transverse channels 126A, 126B formed in a top surface 124 of the top cap. In the present embodiment, these channels 126A, 126B correspond to the channels 116A, 116B in the base plate 100. In this embodiment, each individual recess may receive one of the raised section of the base plate. In any arrangement, the bottom recessed surface is typically continuous around its bottom periphery such that it extends to or near the top surface of the base plate to prevent water from entering under the top cap. In any embodiment, the top surface 124 of the top plate 120 is solid above the fastener recesses in the raised section(s) 110 of the base plate. Thus, the top plate 120 provides weatherproofing for the fastener recesses.

In the illustrated embodiment, the top cap has a central aperture 130 in it top surface. In this embodiment, the aperture extends into the top cap 120 but does not extend through the cap 120. Rather the aperture is formed in a ferrule 132 that is supported on the bottom surface of the cap 120. See FIG. 3B. In one embodiment, where the cap 120 is injection molded, the ferrule may be integrally formed with the cap 120. In other embodiments, a ferrule or threaded bushing may be inserted in or otherwise affixed to the bottom surface of the cap (e.g., in a corresponding aperture). In any case, the aperture allows for inserting a fastener 180 into the top cap for attaching objects to the top plate. See, e.g., FIG. 1. Further, while the present embodiment is shown with a single aperture 130 for receiving a fastener, it will be appreciated that multiple apertures may be provided in the top cap.

As noted, the top surface also includes corresponding channels 126A, 126B (hereafter 126 unless specifically referenced) which are received within the channels 116A, 116B in the base plate, when the top cap 120 is connected to the base plate 110. In the illustrated embodiment, the channels 126 are T-slots. That is, the closed bottom end of each slot is wider than the open upper end. Other shapes are possible. However, it is typically preferred that the slot have an overhanging lip for maintaining object within the slot. Further, in the illustrated embodiment, the slots 126 extend through a side surface 148 of the top cap 120. That is, at least one open end of the slots 126 are exposed on a side surface 148 of the top cap 120 between its top surface 124 and its bottom peripheral edge 123. Use of slots 126 having an exposed end allows for inserting an element with a head/foot that is wider than its body into the slot once the top cap is attached to the base plate. Further, slots with a narrower open end (e.g., overhanging lip) allow maintaining inserted objects within the slot.

The configuration of the base plate 100 having multiple fastener apertures allows for readily applying multiple base plates to roofing surface in an efficient manner. Specifically, as the base plates do not require placement on a rafter, the base plates may be placed, for example, in a matrix that will support corners of multiple photovoltaic cells. At this time, top caps may be attached to the raised sections 110 of the base plates 100. Importantly the caps overlay the fasteners apertures and provides weatherproofing for the fasteners affixing the base plates to the roof surface. That is, once the cap is attached to the base plate 100 no fasteners are exposed.

FIG. 4 illustrates one embodiment of a connection between the top cap 120 and the raised section 110 of the base plate 100. As shown, the top cap 120 includes a spring tab 128 disposed around at least a portion of the inside periphery of its recessed bottom surface 122. The spring tab 128 is received within a corresponding detent 118 formed around at least a portion of the periphery of the raised section 118 of the base plate 110. Accordingly, the top cap 120 is attached to the base plate 100 by placing the top cap 120 over the raised section 110 of the base plate 100 and pushing on the top cap until the spring tab(s) 128 is received within the detent(s) 118. This effectively locks the top cap on to the base plate. Furthermore, it has been found that the top cap is maintained on the base plate with a retraction force that exceeds pullout requirements of most building codes. In this regard, when the top cap 120 is secured to the base plate 100, all of the fasteners are sealed beneath the top cap and the top cap provides a mounting structure for attaching elements to the roof.

Figure 5:
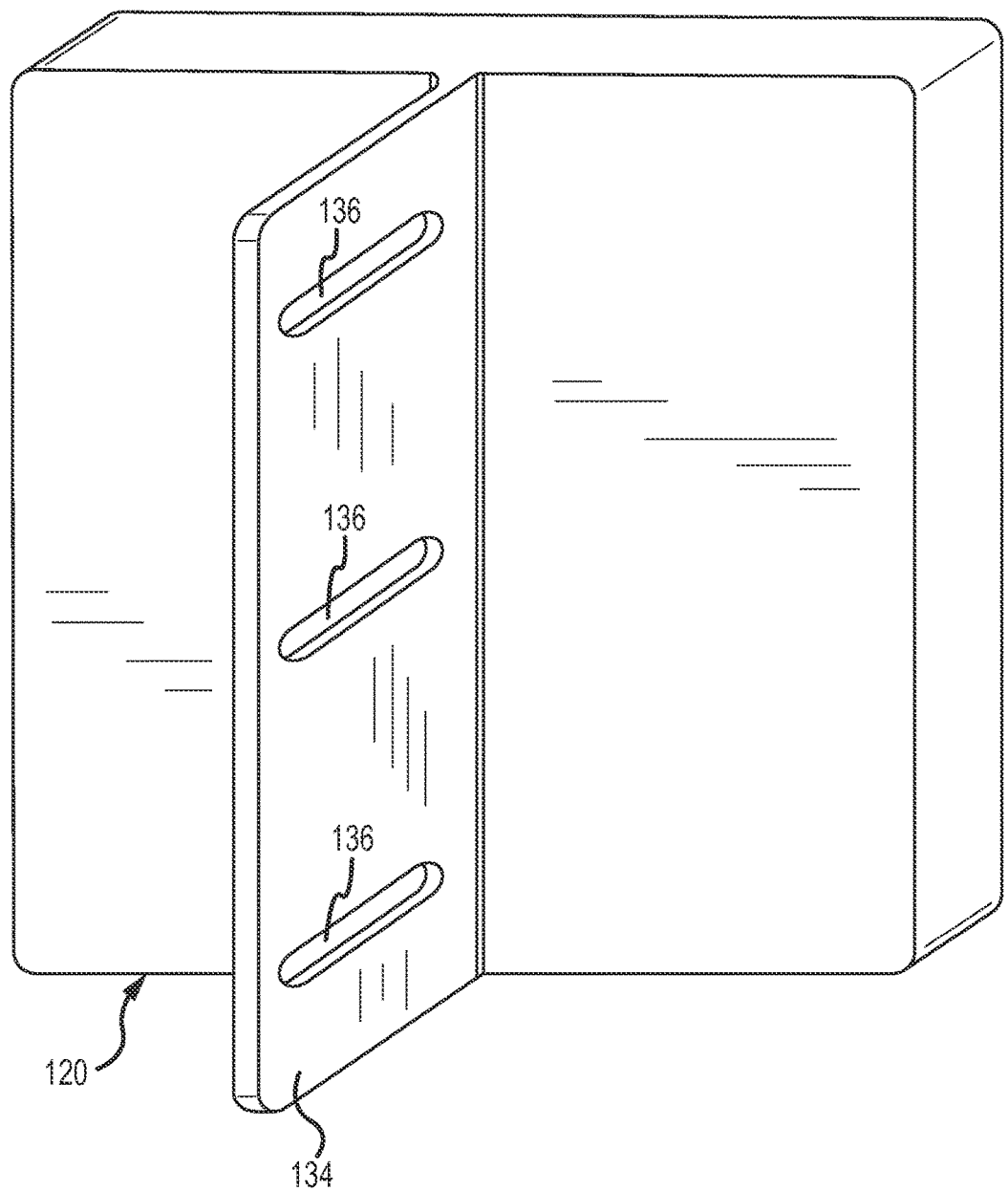
FIG. 5 illustrates another embodiment of a top cap of a roof mount system.

FIG. 5 illustrates a further embodiment of the top cap 120 with a vertical flange 134. In such an arrangement, the vertical flange 134 provides z-axis adjustment for mounting an object to the mounting system. That is, when the flanged top cap 120 is attached to a base plate, slots 136 in the flange 134 may be utilized to attach objects to the mounting system without requiring separate brackets. Further, in the illustrated embodiments, the recessed surface of the top cap 120 and the raised section 110 of the base plate are square. In this regard, the flanged top cap or other top cap (e.g., having recessed channels) may be attached to the base plate in different orientations. For instance, the flange 134 of the top cap 120 may be disposed in a direction that is up-and-down (y-axis aligned) as illustrated on FIG. 5 or side-to-side (x-axis aligned; not illustrated).

Figure 6A:
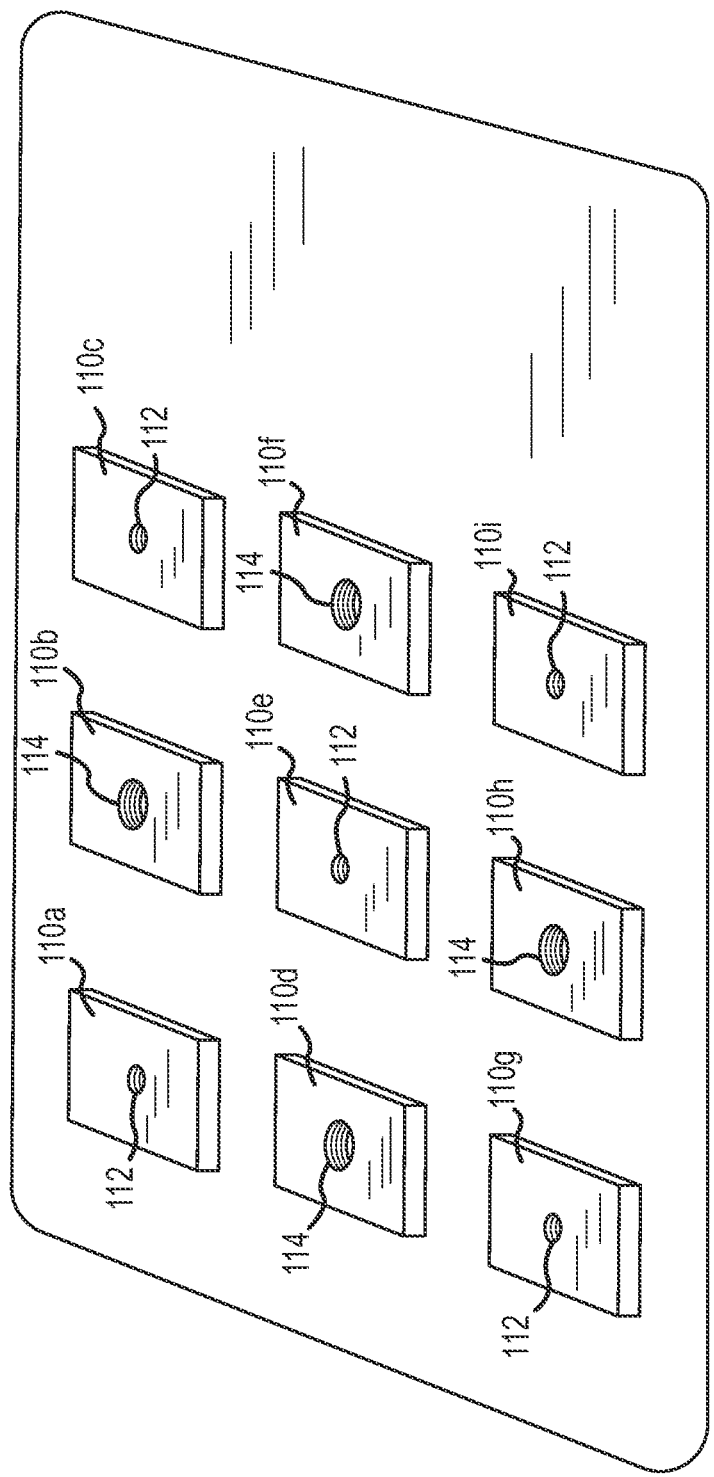
Figure 6B:
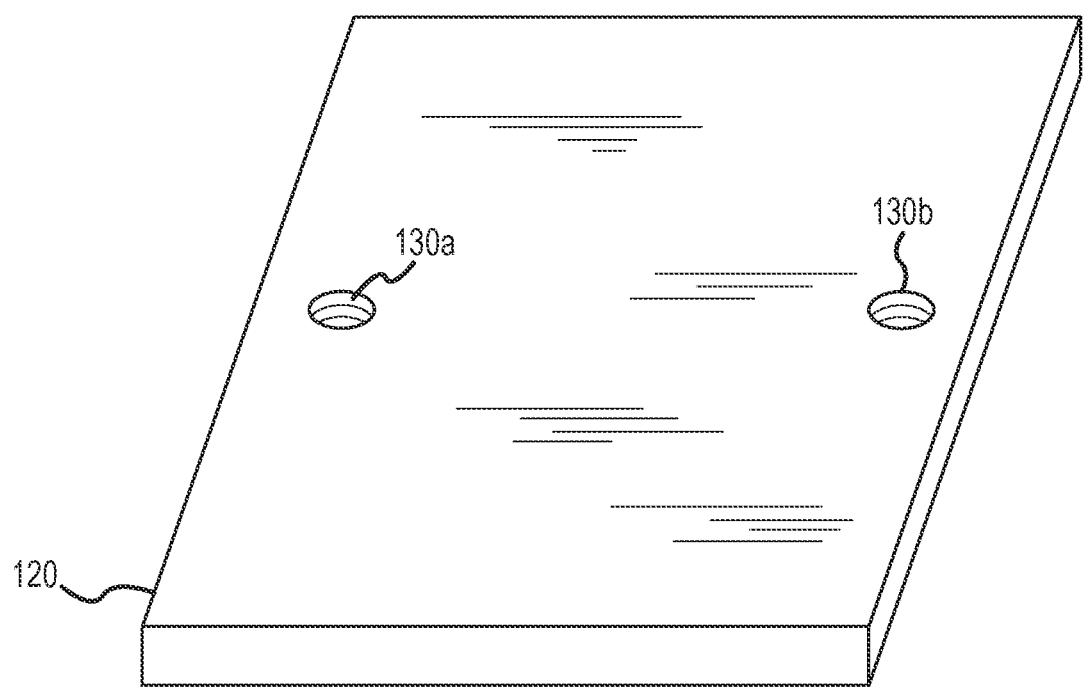
Figure 6C:
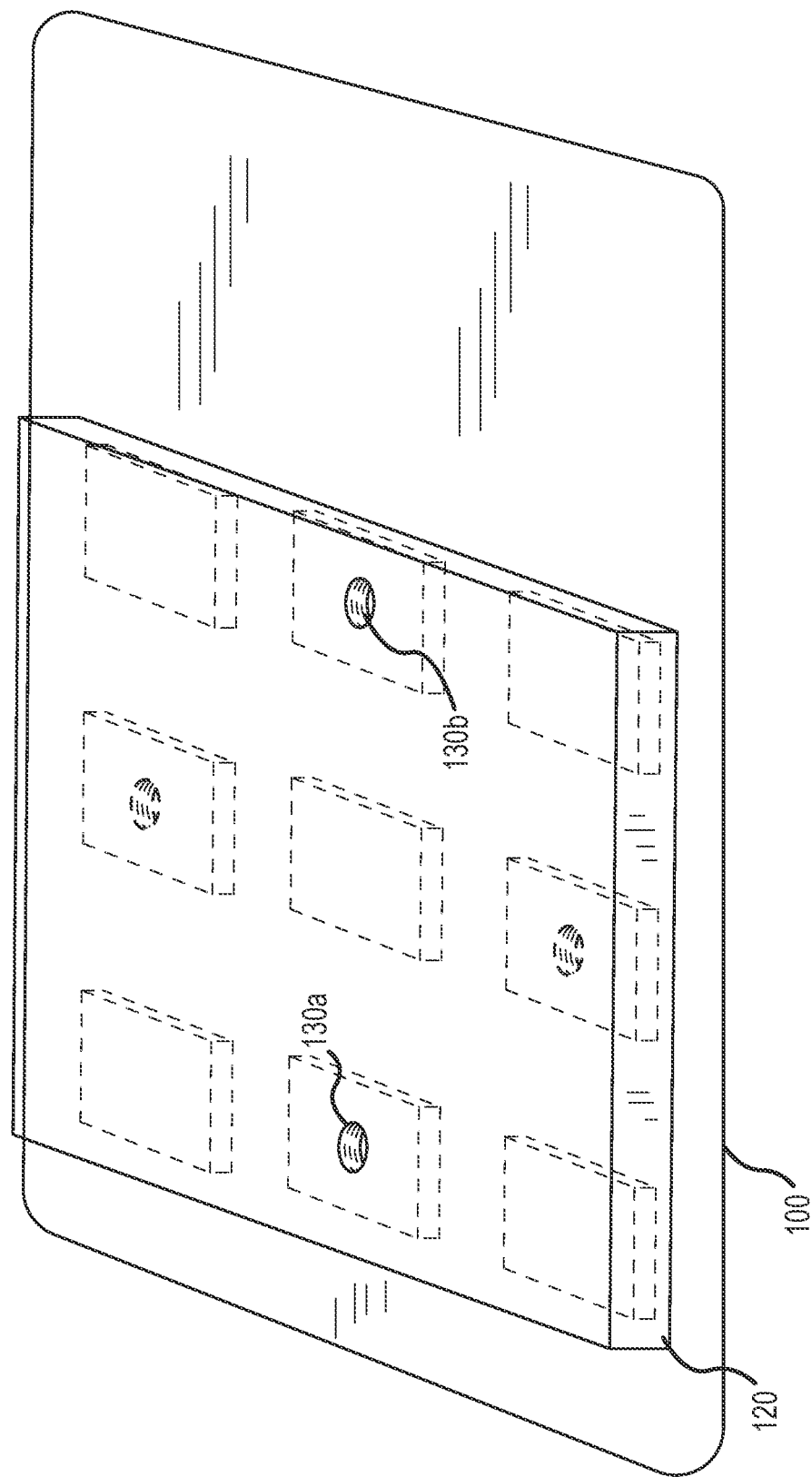

FIGS. 6A-6D illustrate another embodiment of a mounting system 10 that includes a base plate 100 and top cap 120. Again, the base plate 100 includes a raised section 110, which in the present embodiment includes a plurality of raise sections 110A-I. In this embodiment, four of the raised sections 110B, 110D, 110F, and 110H include threaded apertures 114 for use in attaching the top cap 120 to the base plate 110 and/or fixing an object to the base plate. The remainder of the raise sections 110A, 110C, 110E, 110G, and 110I include fastener recesses 112 for affixing the base plate to a roof surface. As shown in FIG. 6B, the top cap 120 in this embodiment has first and second aperture 130A and 130B. These apertures 130A, 130B may be selectively aligned with an opposing pair of the threaded apertures 114 and the base plate as shown in FIG. 6A. This is illustrated in FIG. 6C which shows the apertures 130A and 130B disposed above the corresponding threaded apertures in the base plate 110. Accordingly, once the top cap 120 is disposed relative to the raised section of the base plate 100, threaded fasteners (e.g., bolts) 142 may extend through the top cap and into the threaded apertures 114 of the base plate 100. See FIG. 6D. At this time, the top cap 120 is securely fastened to the base plate 100. Further, it will be appreciated rather than bolting the top cap 120 directly to the base plate, brackets or other attachment mechanisms may fitted between the heads of the bolts 142 and top surface of the top cap 120. Further, as with the flanged embodiment disclosed above, the top cap 120 may be rotated 90 degrees to provide connection along different axis. Accordingly, if brackets are utilized, the brackets may be selectively aligned to provide x or y adjustment. Though not illustrated as utilizing a top cap having recess channels, it will be appreciated that the embodiment of FIGS. 6A-6D may utilize a top cap having recess channels.

Figure 7B:
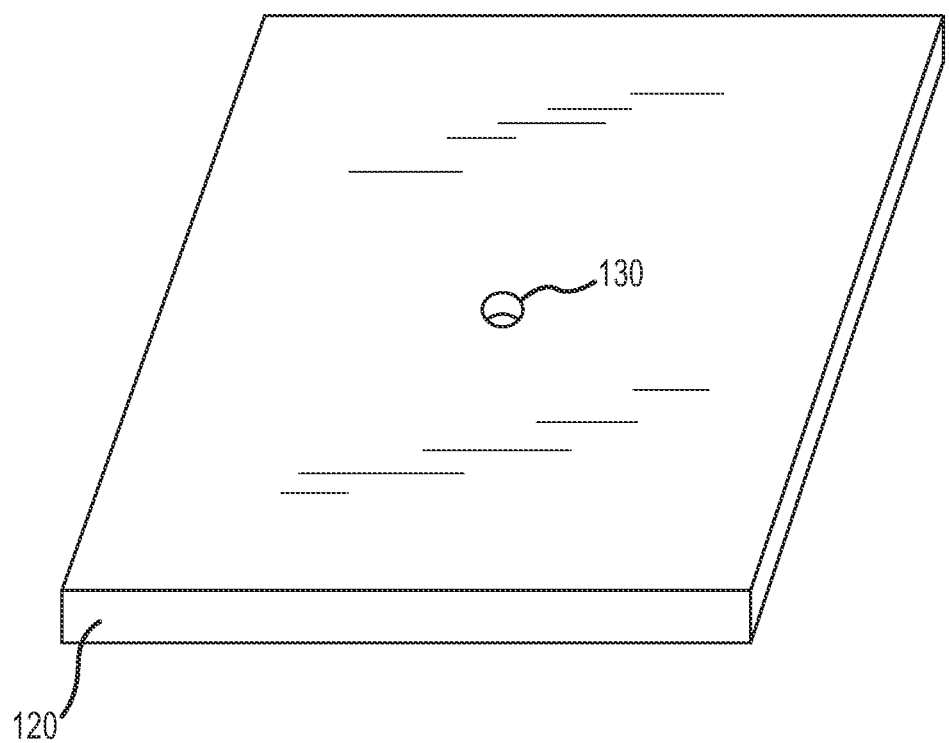
Figure 7C:
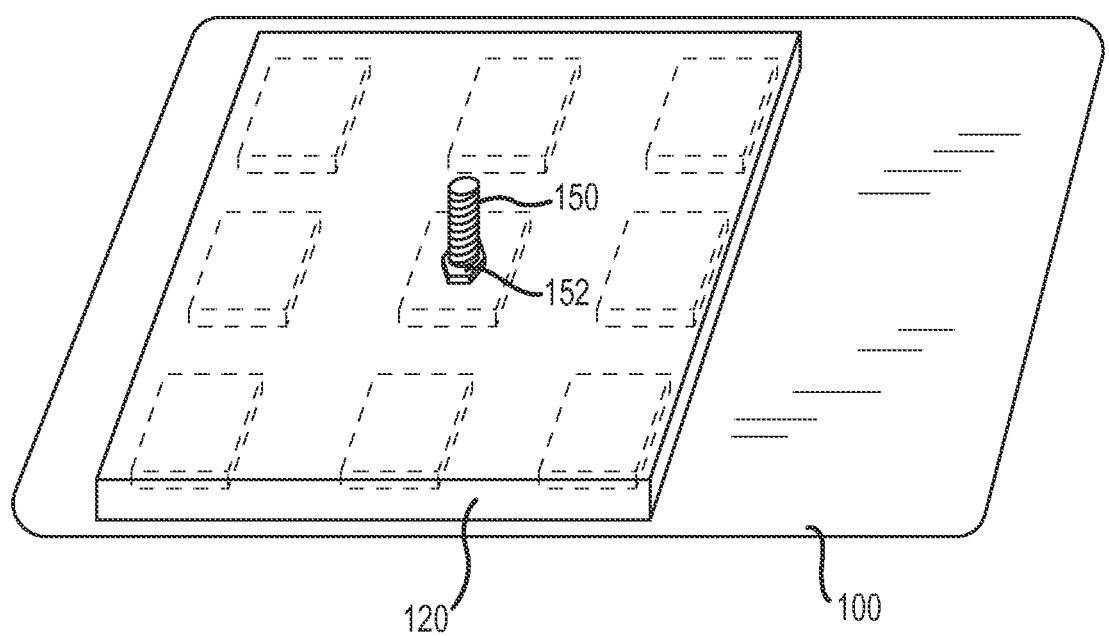

FIG. 7A-7C illustrates further embodiment of the mounting system 10. In this embodiment, the base plate 100 supports at least a first stud 150 on one of the raised sections 110. The remaining raised sections may each include a fastener aperture 112. In this embodiment, the top cap 120 has an aperture 130 that matches the location of the stud 150. See FIG. 7B. Accordingly, the top cap may be disposed over the raised section 110 of the base plate 100 and fasten thereto with a threaded element or nut 152. At such time, the top plate is securely affixed to the base plate 100. Though illustrated as utilizing a single stud 150, it will be appreciated that the embodiment of FIGS. 7A-7C may utilize multiple studs. Accordingly, the top cap 120 would likewise have multiple apertures that allow for mating connection between the top cap 120 and base plate 100.

Figure 8A:
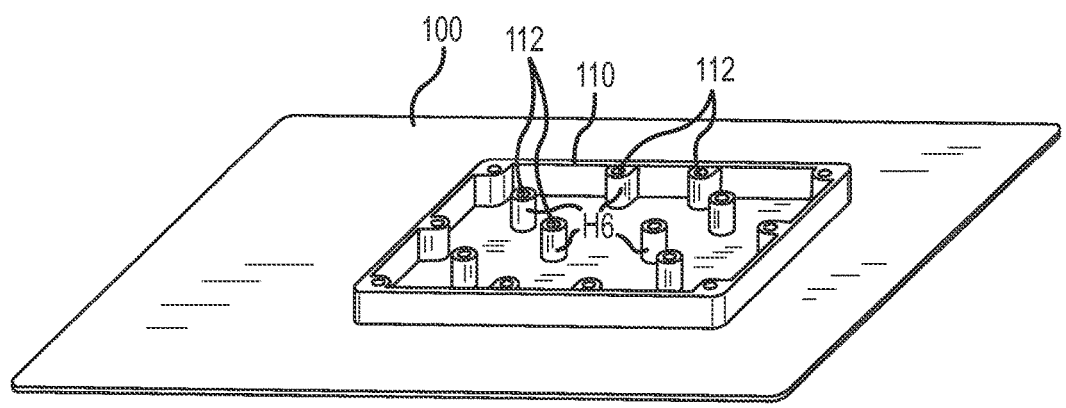
FIGS. 8A and 8B illustrate another embodiment of a roof mount system.
Figure 8B:
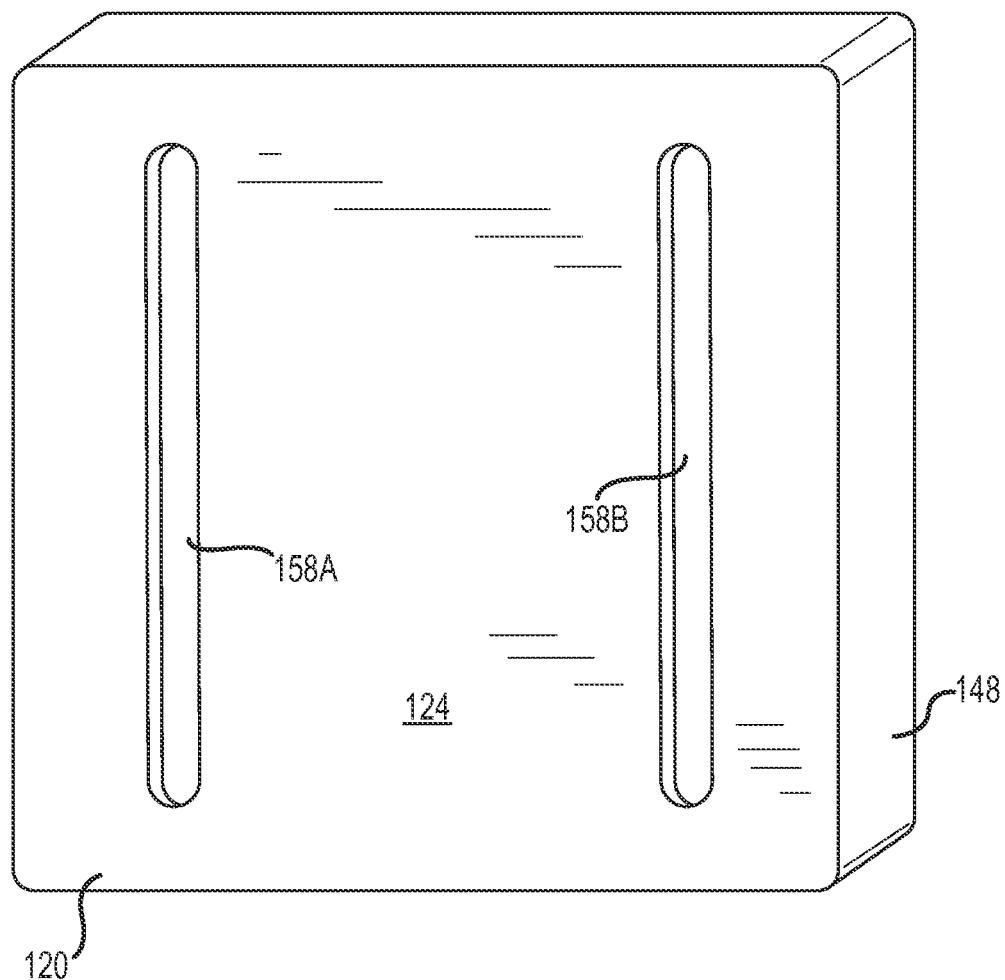

FIGS. 8A and 8B illustrate a further embodiment of mounting system. As illustrated in FIG. 8A, the base plate 100 again includes a raised section 110 within the periphery of the flange 108. In this embodiment, the raised section forms a continuous enclosed wall that prevents water flowing down the roof surface from entering within the interior of the raised section 110. In the illustrated embodiment, a number of freestanding fastener studs 146 are disposed along the periphery of the continuous wall of the raised section 110 as well as within the interior of the raised section 110. Each of the fastener studs 146 includes a fastener recess 112 that may be utilized to affix the base plate 100 to a roof surface. Further one or more of the fastener studs 146 may be utilized to receive a fastener that fixes a top cap the base plate 110. As illustrated, this embodiment of a raised section 110 having a continuous sidewall does not permit utilization of the top cap having a recessed channels. Accordingly, a top cap 120 similar to that illustrated in FIG. 8B may be utilized. As shown, the top cap 120 again has a top surface 124 and bottom recessed surface (not shown) that is sized to receive the continuous sidewall of the raised section 110. That is, the top cap 120 has a continuous sidewall that is configured to extend around the continuous sidewall of the raised section 110. In order to affix an object to the top cap 120, the top cap includes first and second elongated apertures 158A, 158B that extend through the top surface 124. Accordingly, once the top cap 120 is affixed to the base plate 100 (e.g., snap fit mechanical fasteners etc.) T-bolts or other fasteners may be inserted into the elongated apertures to affix an object to the top cap 120.

Figure 9A:
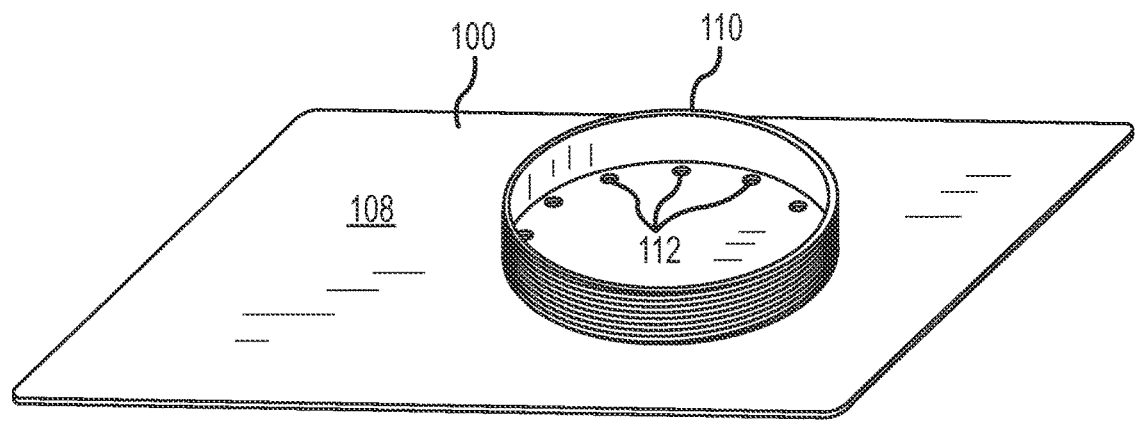
FIGS. 9A-9C illustrate another embodiment of a roof mount system.
Figure 9B:
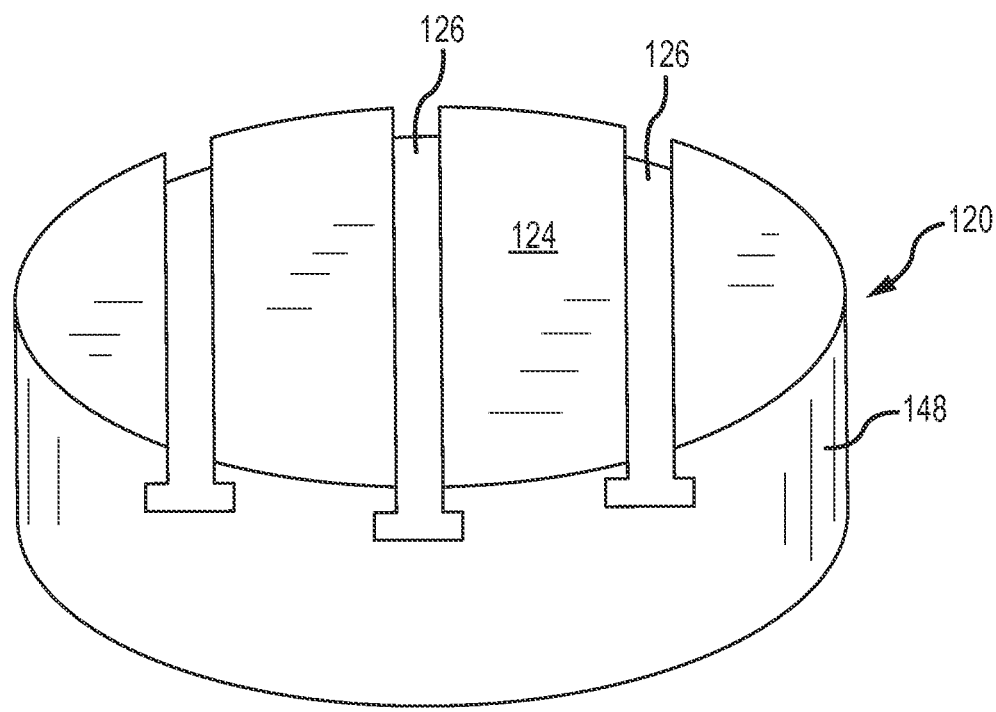
Figure 9C:
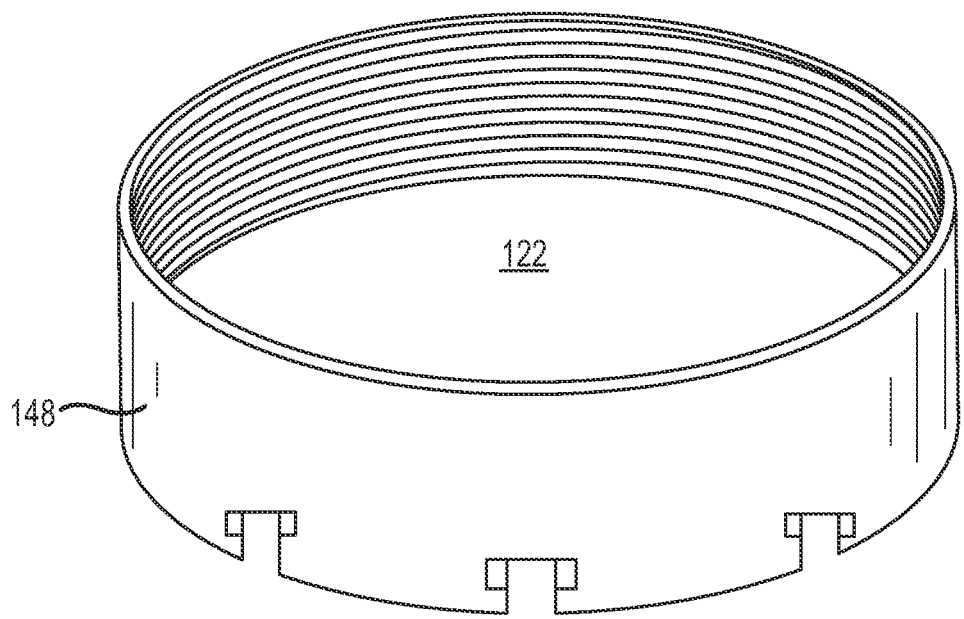

FIGS. 9A-9C illustrate a further embodiment of the roof mounting system. As shown in FIG. 9A, the base plate 100 includes a circular raised section 110 dispose within the periphery of the flange 108. In this embodiment, a number of fastener apertures 112 are disposed within the periphery of the raised section 110. Further, the raised section 110 is circular and includes threads about its outside periphery. These threads allow for receiving a threaded top cap 120 as illustrated in FIGS. 9B and 9C, which show a top and bottom views of a circular top cap 120. The circular top cap 120 again has a top surface 124 and a recessed bottom surface 122. The top cap 120 includes a circular sidewall 148 that is threaded about its interior surface. Accordingly, the circular top cap 120 may be threadably engaged with the outside threads on the raised section 110 of the base plate 100. This embodiment provides not only secure connection between the top cap 120 and the base plate 100 but also provides the additional benefit of height adjustment. That is, the top cap 120 may be threaded to a desired height above the roof surface. In the illustrated embodiment, the top surface 124 of the top cap 120 includes multiple recessed channels 126.

These channels may be utilized to affix an object to the top cap 120. However, it will be appreciated that other embodiments may omit the recessed channels and use other means (e.g., ferrules) to attach objects to the circular top cap.

Figure 10:
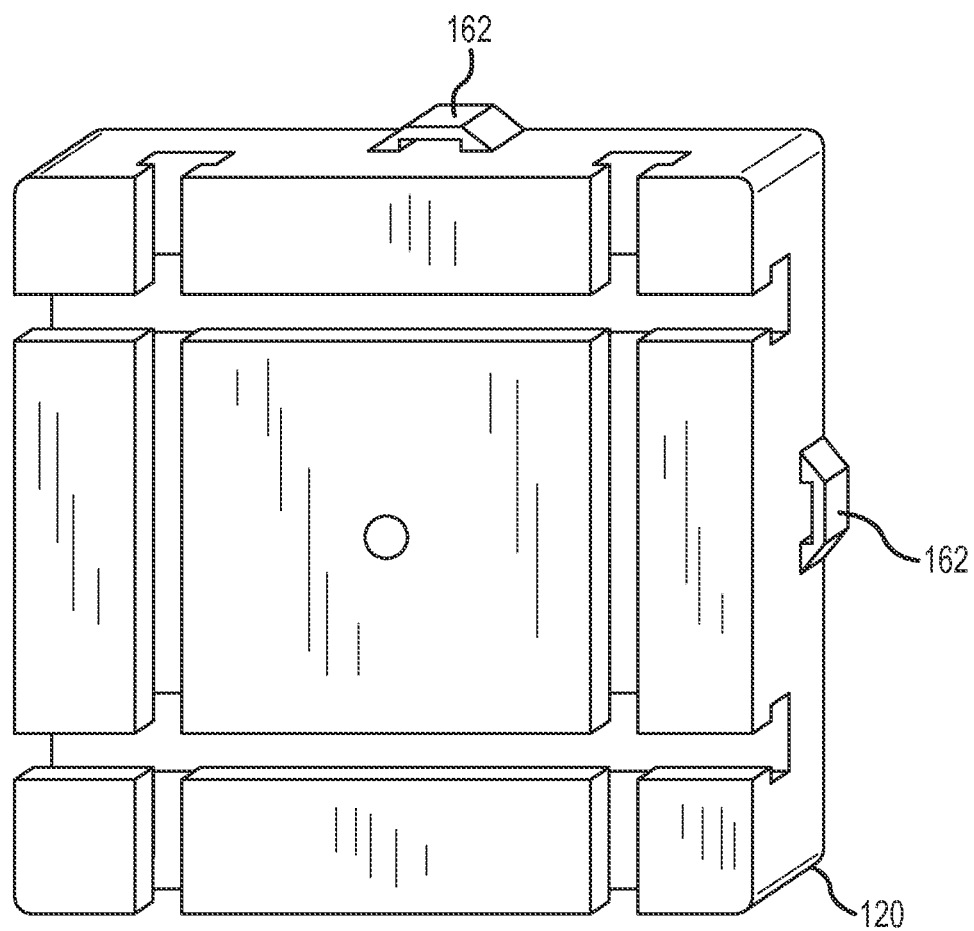
FIG. 10 illustrates another embodiment of a top cap of a roof mount system.

Multiple variations exist for both the base plate and the top plate. FIG. 10 illustrates another embodiment of a top cap 120. In this embodiment, the top cap includes side clips 162 attached to the side surfaces 148. These side clips may receive spring tabs (not shown) attached to the base plate.

Figure 11A:
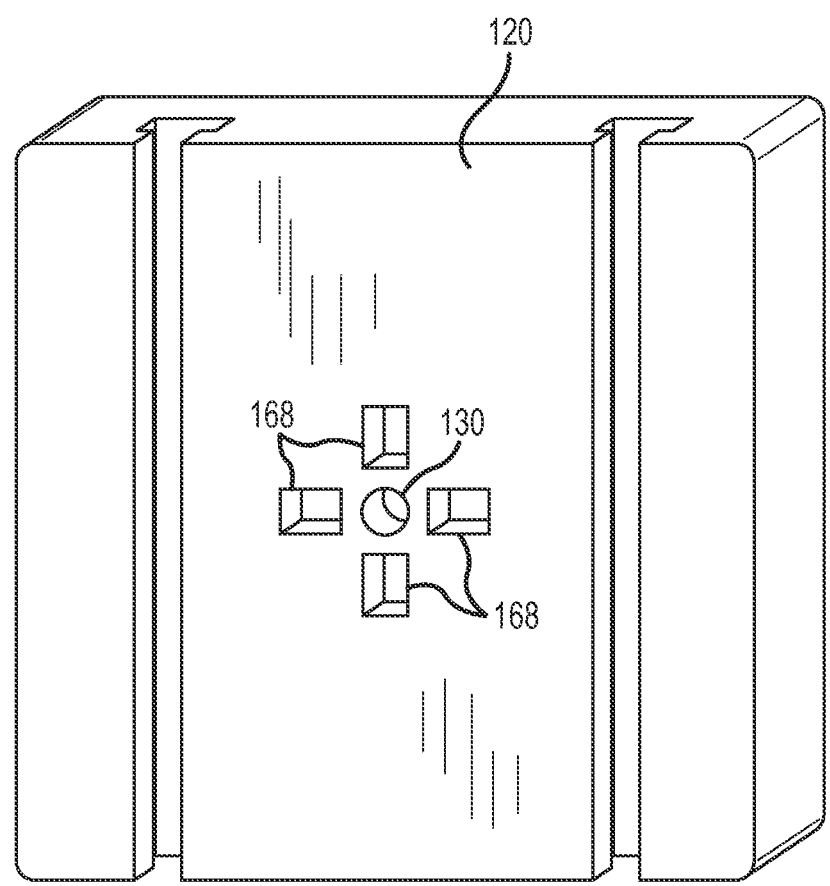
FIG. 11A illustrates another embodiment of a top cap of a roof mount system.
Figure 11B:
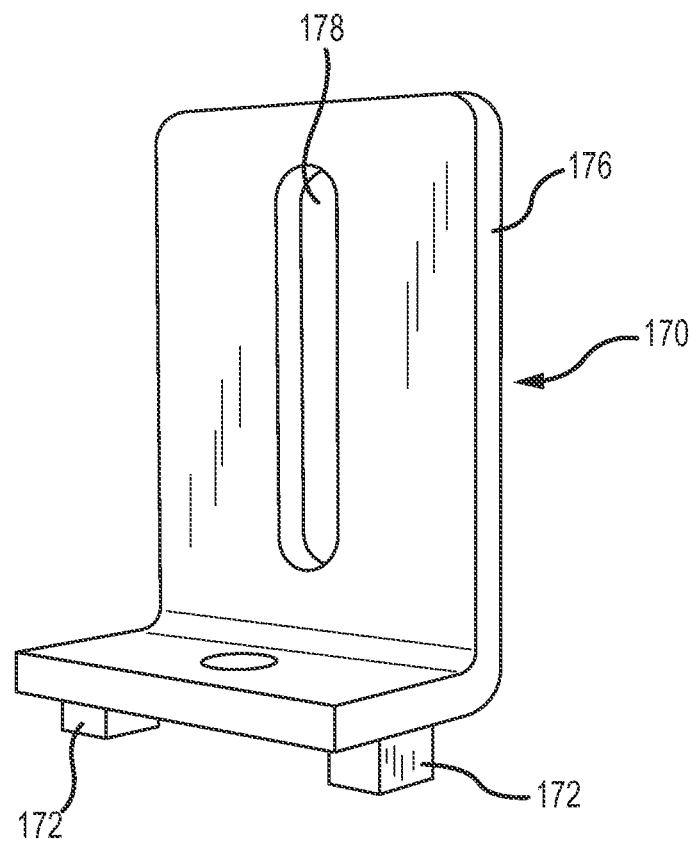
FIG. 11B illustrated one embodiment of an attachment element.

FIGS. 11A and 11B illustrate a variation of the top cap 120 and a mounting element 170 that is adapted to engage the top cap. As shown, the top cap 120 includes a top surface 124 having a central aperture 130 for receiving a fastener for attaching an object to the cap 120.

Disposed about the central aperture 130 are four recesses 168 that extend into but not though the top surface of the top cap. These recesses are configured to receive tabs 172 formed on the bottom surface of the mounting element 170. As shown, the mounting element is a vertical flange 176 having an elongated aperture 178 that may be affixed to the aperture 130 of the top cap 120 and/or the base plate (not shown) via an aperture 174 extending though a base of the mounting element 170. By aligning the two tabs 172 with two of the four recesses 168 in the top surface of the top cap, the x or y orientation of the mounting element 170 may be fixed.

Figure 12:
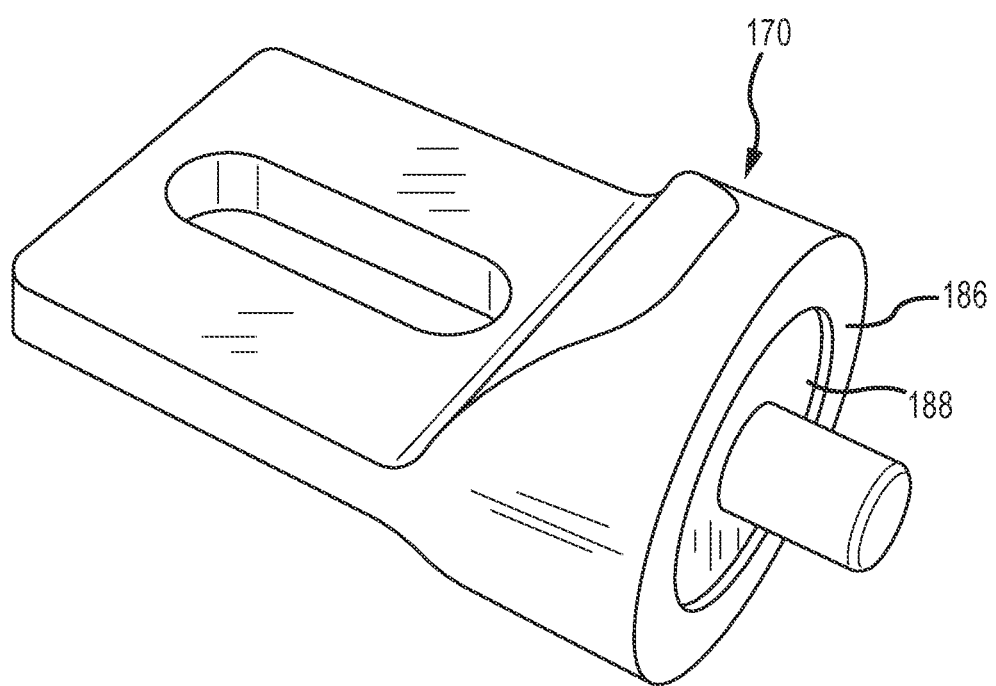
FIG. 12 illustrated one embodiment of an attachment element.

FIG. 12 illustrates another embodiment of an attachment element 170 that may be attached to the top cap and/or base plate. As shown, the attachment element has a generally circular base 186, which may have a recess 188 for receiving a pliable washer. A threaded stud 190 extends from the circular base 186. This stud may be threaded into the top cap or base plate. An upper end of the attachment element includes a flange 176 with an elongated aperture 178.

Figure 13:
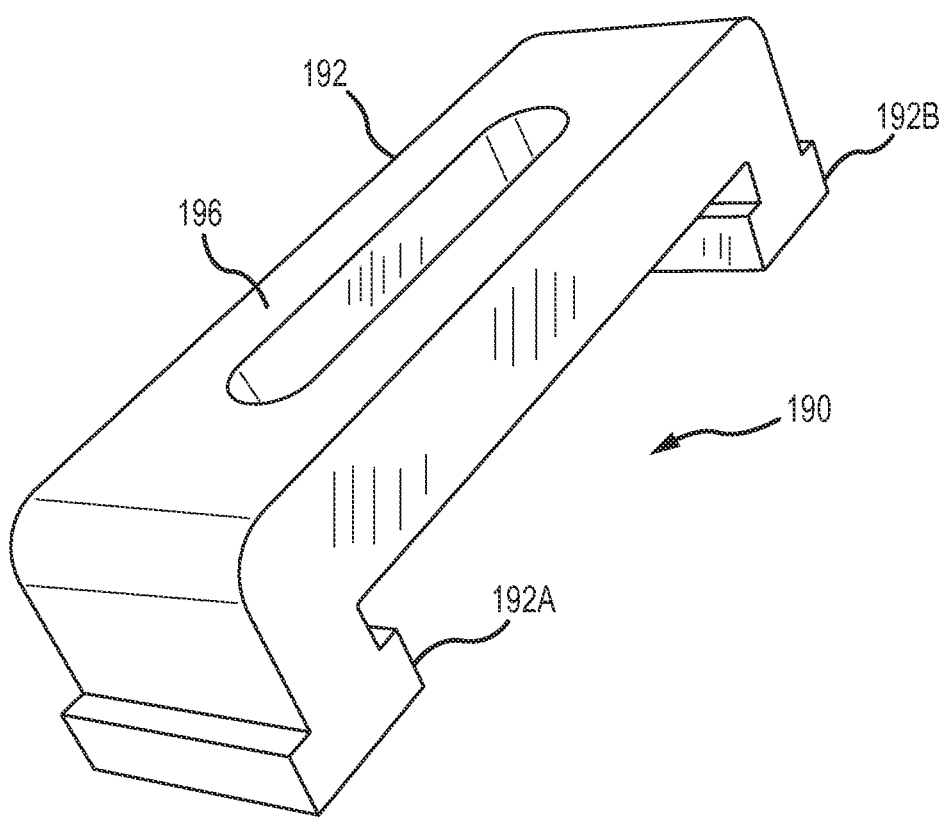
FIG. 13 illustrated another embodiment of an attachment element.
Figure 14:
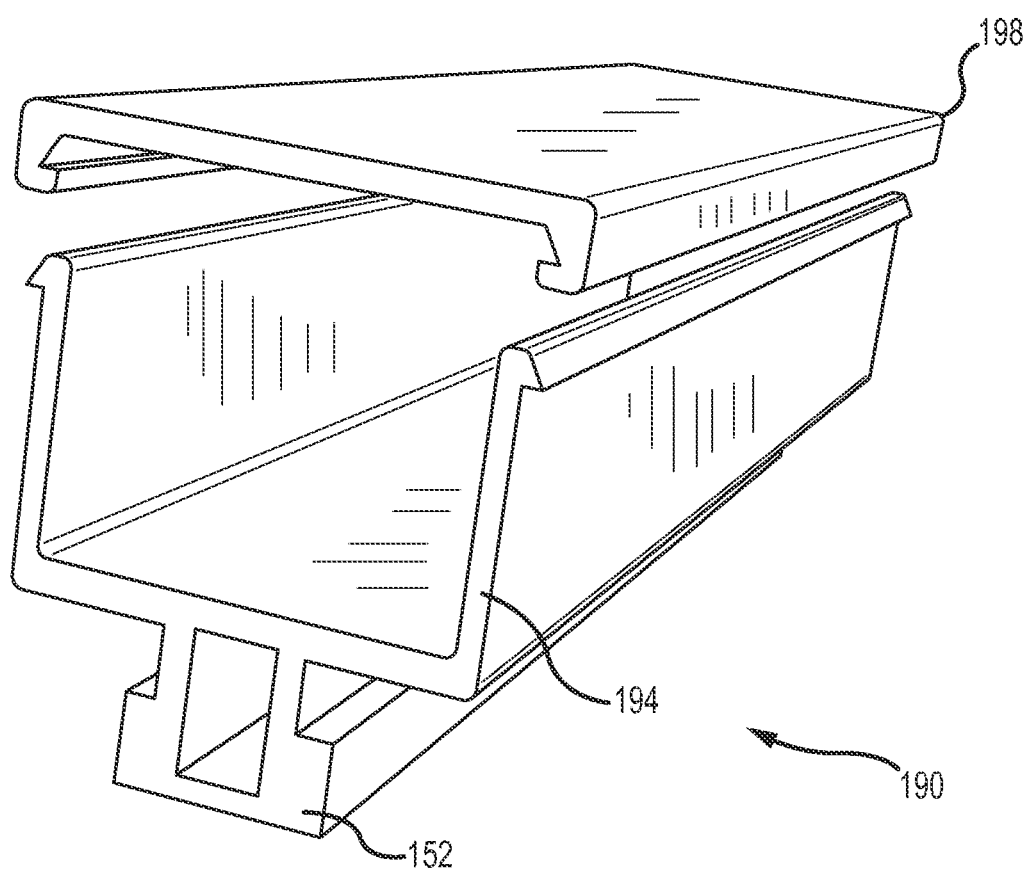
FIG. 14 illustrated another embodiment of an attachment element.

FIGS. 13 and 14 illustrate two non-limiting examples of attachment elements 190 that may be inserted into recessed channels of the top plates. FIG. 13 illustrates and attachment element 190 having first and second T-shaped feet 192a, 192b that may be inserted into corresponding recesses in a top plate. Though shown as being T-shaped, it will be appreciated that the feet 192 may have any shape that corresponds to the shape of the recess. In the present embodiment, a body 194 having an elongated aperture 196 extend between the feet 192. The body is offset from the feet to allow it to extend above the top surface of a top plate when inserted into the channels of the top plate. The elongated aperture 196 may be used to attach and object to the attachment element and/or affix the position of the attachment element to the top plate. For instance, a bolt may be threaded through the aperture (e.g., a nut may be supported below the aperture to engage the top surface of the top plate. Such a bolt may affix the attachment element at a desired location in the recessed channel(s). FIG. 14 illustrates an attachment element 190 having a single foot 192 and a U-shaped body. The U-shaped body 194 may be of considerable length to allow the body to extend between two or more aligned mounting systems. The U-shaped body may provide a location to house cabling when used with PV panels. Further, the open end of the U-shaped body may include a cover 198 that protects elements (e.g., cabling) disposed in the U-shaped body.

Figure 15:
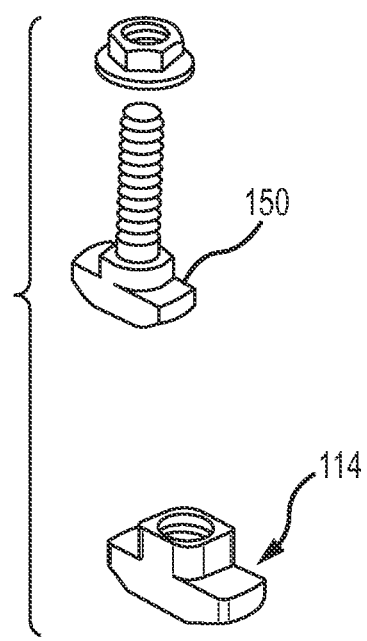
FIG. 15 illustrates T-bolts and T-nuts for use with the mounting system.

As noted above, the embodiments of FIGS. 6A-7C disclose the use of studs and or nuts as incorporated into the base plate 110. FIG. 15 illustrates a T-bolt stud 150 and a T-nut 114 that may be affixed to the base plate. Both the stud 150 and nut 114 include an elongated foot that may be disposed within one or more recesses 104 in the bottom surface of the base plate 110. See, e.g., FIG. 2B.

In any embodiment, it will be appreciated that certain variations may be made in are considered within the scope of the presented inventions. For instance, the height (e.g. thickness) of the top plate may be adjusted to provide differing finished heights for the mounting system. Alternatively, various different objects may be attached to the top cap and/or base plate to provide differing mounting points. Various such objects are described in co-owned US patent publication number 20130291479, which is incorporated herein by reference. The 479 publication shows further numerous embodiments of objects that may be attached to the presented mounting systems.

In various embodiments, these mounting structures may provide X and or Y adjustment and/or hinged adjustment. In a further arrangement, one or more of the channels in the top cap faceplate may be utilized to affix an inverter to a roof surface. Likewise, various cable mounting channels may be provided for attachment to the top plate. Such an arrangement, such channels may extend between multiple plates.

Although the system has been discussed in terms of mounting solar panels on roofs, it is to be understood that the various assemblies could be used to mount any number of devices on roofs or other surfaces with little or no modification. Devices that could be mounted, include, but are not limited to photovoltaic (framed and unframed), thermal, hybrid collectors, antennas, telecom equipment, pipes, conduits, and others. For unframed solar panels known in the art, rubber pads would be used to protect the panel.

In all embodiments, the components can be made of aluminum, copper, mild steel, stainless steel, nickel, or other metals, coated metal, plastic, fiberglass, composites, ceramic, carbon fiber material, rubber polymer, concrete, cementitious or any other material with the necessary physical characteristic. In some applications the assembly will need to be conducting, in order to allow for grounding of the components mounted on the system. In all embodiments, if desired the installer can put caulk or other sealant around all joints as a further assurance of water proof joints. This is not necessary under normal usage conditions, but may be desired in harsh environments and/or remote locations.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

The invention claimed is:

1. A roof mounting device, comprising:
a base plate having:
  a bottom surface for juxtaposing against a roof surface;
  an elevated section on a top surface of said base plate and disposed within a periphery of said top surface of said base plate, wherein the base plate forms a flange around said elevated section;
  a plurality of fastener recesses disposed within a periphery of said elevated section, wherein said fastener recesses extend through at least a portion of said base plate;
a top cap having:
  a top surface;
  an at least partially recessed bottom surface, wherein said recessed bottom surface is sized to receive said elevated section of said base plate when said top cap is disposed on said base plate;
  a fastener for attaching said top cap to said base plate;
  at least one attachment structure for attaching a component to said top cap; and
  at least one spring tab disposed about at least a portion of a periphery of said bottom recessed surface, wherein said spring tab engages a detent on a periphery of said elevated section of said base plate.

2. The device of claim 1, wherein said fastener for attaching said top cap to said base plate further comprises: first and second mating threaded elements.

3. The device of claim 1, wherein said top cap covers each of said fastener recesses when said top cap is attached to said bottom plate.

4. The device of claim 1, wherein a periphery of said recessed bottom surface of said top cap extends about a periphery of the elevated section of said base plate.

5. The device of claim 1, wherein said elevated section has at least one recessed channel extending across said elevated section.

6. The device of claim 5, wherein a top surface of said top cap has at least one corresponding recessed channel, wherein said corresponding recessed channel is received in said recessed channel of said elevated section, when said top cap is attached to said base plate.

7. The device of claim 6, wherein a bottom closed end of said corresponding recessed channel is wider than a top open end of said corresponding recess channel.

8. The device of claim 6, wherein at least one end of said corresponding recessed channel is exposed on a side surface of said top cap between said top surface and a bottom edge of said recessed surface.

9. The device of claim 8, further comprising:
an attachment element having:
  a lower portion with a cross-sectional shape that matches a cross-sectional shape of said corresponding recessed channel; and
  an upper portion extending above the top surface of the top cap.

10. The device of claim 5, wherein said elevated section has at least first and second recessed channels, wherein said first and second recessed channels are non-parallel.

11. The device of claim 1, wherein said top cap further comprises:
a projection extending above said top surface, wherein said projection forms said attachment structure.

12. The device of claim 11, wherein said projection comprises a threaded stud.

13. The device of claim 12, further comprising:
a bracket disposed over said stud; and
a nut threadably engaging said threaded stud affixing said bracket to said top cap.

14. The device of claim 11, wherein said projection comprises a fin, wherein said fin includes at least a first aperture.

15. The device of claim 1, wherein said top cap further comprises:
at least one aperture extending a through a portion of said top cap between said top surface and a bottom edge of said top cap.

16. The device of claim 15, wherein an area surrounding said at least one aperture is substantially solid between said top surface and a bottom plane of said top cap defined by a periphery of said recessed bottom surface.

17. A roof mounting device, comprising:
a base plate having:
  a bottom surface for juxtaposing against a roof surface;
  an elevated section on a top surface of said base plate and disposed within a periphery of said top surface of said base plate, wherein said elevated section has at least one recessed channel extending across said elevated section and wherein the base plate forms a flange around said elevated section;
  a plurality of fastener recesses disposed within a periphery of said elevated section, wherein said fastener recesses extend through at least a portion of said base plate;
a top cap having:
  a top surface;
  an at least partially recessed bottom surface, wherein said recessed bottom surface is sized to receive said elevated section of said base plate when said top cap is disposed on said base plate;
  a fastener for attaching said top cap to said base plate; and
at least one attachment structure for attaching a component to said top cap.

18. The device of claim 17, wherein a top surface of said top cap has at least one corresponding recessed channel, wherein said corresponding recessed channel is received in said recessed channel of said elevated section, when said top cap is attached to said base plate.

19. The device of claim 18, wherein a bottom closed end of said corresponding recessed channel is wider than a top open end of said corresponding recess channel.

20. The device of claim 19, wherein at least one end of said corresponding recessed channel is exposed on a side surface of said top cap between said top surface and a bottom edge of said recessed surface.

* * * * *